(12) United States Patent
Ye et al.

(10) Patent No.: US 11,915,003 B2
(45) Date of Patent: Feb. 27, 2024

(54) PROCESS PARASITISM-BASED BRANCH PREDICTION METHOD AND DEVICE FOR SERVERLESS COMPUTING, ELECTRONIC DEVICE, AND NON-TRANSITORY READABLE STORAGE MEDIUM

(71) Applicant: SHENZHEN INSTITUTES OF ADVANCED TECHNOLOGY, Shenzhen (CN)

(72) Inventors: Kejiang Ye, Shenzhen (CN); Yanying Lin, Shenzhen (CN); Chengzhong Xu, Shenzhen (CN)

(73) Assignee: SHENZHEN INSTITUTES OF ADVANCED TECHNOLOGY, Shenzhen (CN)

( * ) Notice: Subject to any disclaimer, the term of this patent is extended or adjusted under 35 U.S.C. 154(b) by 0 days.

(21) Appl. No.: 18/459,397

(22) Filed: Aug. 31, 2023

(65) Prior Publication Data

US 2023/0409330 A1    Dec. 21, 2023

Related U.S. Application Data

(63) Continuation of application No. PCT/CN2022/138141, filed on Dec. 9, 2022.

(30) Foreign Application Priority Data

Dec. 18, 2021  (CN) .......................... 202111560316.2

(51) Int. Cl.
*G06F 9/38*   (2018.01)
*G06N 5/046*  (2023.01)

(52) U.S. Cl.
CPC ........... *G06F 9/3806* (2013.01); *G06N 5/046* (2013.01)

(58) Field of Classification Search
CPC .................................................... G06F 9/3806
See application file for complete search history.

(56) References Cited

U.S. PATENT DOCUMENTS

| 10,891,153 B1* | 1/2021 | Kinsburskiy ........... G06F 9/485 |
| 2015/0081374 A1* | 3/2015 | Sahlstrom ........ G06Q 10/06315 |
| | | 705/30 |

(Continued)

FOREIGN PATENT DOCUMENTS

| CN | 110837408 A | 2/2020 |
| CN | 112860450 A | 5/2021 |
| CN | 113656179 A | 11/2021 |

OTHER PUBLICATIONS

International Search Report issued in corresponding International application No. PCT/CN2022/138141, dated Feb. 14, 2023.

(Continued)

*Primary Examiner* — Michael J Metzger

(57) ABSTRACT

Disclosed are a process parasitism-based branch prediction method and device for serverless computing, an electronic device, and a readable storage medium. The method includes: receiving a calling request of a user for a target function; when capacity expansion is required, scheduling a container executing the target function to a new server that has not executed the target function in a preset period of time, wherein a parasitic process is pre-added to a base image of the container; triggering the parasitic process when the container is initialized on the new server, the parasitic process being used for initiating a system call, and triggering a system kernel to select a target template function according to the type of the target function and copying the target template function N times; using execution data of the copied N target template functions as training data to train a branch predictor on the new server.

10 Claims, 2 Drawing Sheets

(56) References Cited

U.S. PATENT DOCUMENTS

2020/0081745 A1  3/2020  Cybulski et al.
2021/0184941 A1  6/2021  Tootaghaj et al.

OTHER PUBLICATIONS

Written Opinion of the International Search Authority in corresponding International application No. PCT/CN2022/138141, dated Feb. 14, 2023.

* cited by examiner

PROCESS PARASITISM-BASED BRANCH PREDICTION METHOD AND DEVICE FOR SERVERLESS COMPUTING, ELECTRONIC DEVICE, AND NON-TRANSITORY READABLE STORAGE MEDIUM

CROSS REFERENCE TO RELATED APPLICATIONS

The present application is a continuation-in-part of International (PCT) Patent Application No. PCT/CN2022/138141, filed on Dec. 9, 2022, which claims priority of Chinese Patent application No. CN202111560316.2, filed on Dec. 18, 2021. The entire contents of the above-identified applications are incorporated herein by reference.

TECHNICAL FIELD

The present invention relates to the technical field of serverless computing, and in particular, to a process parasitism-based branch prediction method and device for serverless computing, an electronic device, and a non-transitory readable storage medium.

BACKGROUND

Serverless computing refers to building and running applications without the need to manage infrastructure such as servers. It describes a more fine-grained deployment model in which applications are decomposed into one or more fine-grained functions, which are uploaded to a platform and then executed, extended, and billed based on current needs.

Serverless computing does not mean that servers are no longer used to host and run codes, nor does it mean that operation and maintenance engineers are no longer needed. Instead, it means that consumers of serverless computing no longer need to configure, maintain, update, expand, and plan capacity for servers. These tasks and functions are all handled by serverless platforms and completely abstracted from developers and IT/operations teams. Therefore, developers focus on writing business logic of applications, and operational engineers can elevate their focus to more critical business tasks.

In a computer architecture, a branch predictor is a digital circuit that guesses which branch will be run before execution of a branch instruction is ended so as to improve performance of a processor's instruction pipeline. A purpose of using a branch predictor is to improve a flow of instruction pipelining.

A branch predictor needs a certain amount of training to achieve a relatively stable high prediction accuracy. Therefore, when functions in serverless computing are scheduled to a server, branch prediction accuracy in the initial stage is usually very low. In serverless computing, running time of functions is usually at the millisecond level, and high branch prediction errors often lead to significant performance overhead, thereby reducing execution performance of functions in serverless computing.

Current solutions are usually to redesign branch predictors and redesign branch predictor algorithms. By expanding a sensing range of a branch predictor and making full use of the principle of time locality, the overall accuracy of branch prediction is improved. However, a branch predictor is a hardware device, and redesigning a branch predictor requires modification at the hardware level, which will reduce versatility of branch prediction.

SUMMARY OF THE DISCLOSURE

Technical Problem

The purpose of the present invention is to provide a process parasitism-based branch prediction method and device for serverless computing, an electronic device, and a non-transitory readable storage medium, which improves accuracy of branch prediction and improves execution performance of functions in serverless computing without changing hardware of a branch predictor.

Technical Solution

In order to achieve the above purpose, the present invention provides a process parasitism-based branch prediction method for serverless computing comprising the following steps: receiving a calling request of a user for a target function; when capacity expansion is required, scheduling a container executing the target function to a new server that has not executed the target function in a preset period of time, wherein a parasitic process is pre-added to a base image of the container; triggering the parasitic process when the container is initialized on the new server, wherein the parasitic process is configured for initiating a system call, and triggering a system kernel to select a target template function according to a type of the target function and copying the target template function N times; and using execution data of the copied N target template functions as training data to train a branch predictor on the new server.

Furthermore, after the receiving a calling request of a user for a target function, the method further comprises: determining whether there is a running instance executing no function task in a current computing environment; if there is, scheduling the target function to the instance executing no function task in the current computing environment, and executing a calculation task of the target function using the instance.

Furthermore, the process parasitism-based branch prediction method for serverless computing further comprises: if there is no running instance executing no function task in the current computing environment, determining whether the current computing environment requires capacity expansion; if capacity expansion is not required, generating an instance in the current computing environment, and executing a calculation task of the target function using the instance.

Furthermore, the determining whether the current computing environment requires capacity expansion comprises: determining whether CPU usage of all instances in the current computing environment exceeds a preset value; if yes, determining that the current computing environment requires capacity expansion.

Furthermore, the process parasitism-based branch prediction method for serverless computing further comprises: after the container is initialized on the new server, generating an instance, and executing a calculation task of the target function using the instance.

Furthermore, the type of the target function is inferred using Python deep learning algorithm.

Furthermore, the target template function is centered around programming languages, if-else logic structures, for loop position features, and function features.

In order to achieve the above purpose, the present invention further provides a process parasitism-based branch prediction device for serverless computing comprising: a receiving module configured to receive a calling request of a user for a target function; a scheduling module configured to: when capacity expansion is required, schedule a container executing the target function to a new server that has not executed the target function in a preset period of time, wherein a parasitic process is pre-added to a base image of the container; a calling module configured to: trigger the parasitic process when the container is initialized on the new server, wherein the parasitic process is configured to initiate a system call, and trigger a system kernel to select a target template function according to a type of the target function and copy the target template function N times; and a training module configured to use execution data of the copied N target template functions as training data to train a branch predictor on the new server.

In order to achieve the above purpose, the present invention further provides an electronic device comprising a processor and a memory, wherein the memory stores a computer program, and the computer program, when being executed by the processor, implements the steps of the process parasitism-based branch prediction method for serverless computing according to any one of the above items.

In order to achieve the above purpose, the present invention further provides a non-transitory readable storage medium, wherein the non-transitory readable storage medium stores a computer program, and the computer program, when being executed by a processor, implements the steps of the process parasitism-based branch prediction method for serverless computing according to any one of the above items.

Advantageous Effect

1. Compared with redesigning branch predictors, the present invention has universality. By the method of pre-executing a template function, the present invention can improve accuracy of branch prediction of all types of servers, improve execution performance of functions in serverless computing, and is applicable to all architectures (including ARM, RISC-V, etc.).
2. Compared with the time locality of the branch prediction algorithm, the present invention executes the template function in advance, and makes full use of the time locality of branch predictors.

Other features and advantages of the present invention will be described in the following specification, and becomes partially apparent from the specification or is understood through the implementation of the present invention. The purpose and other advantages of the present invention can be achieved and obtained through the structures specifically pointed out in the written specification, claims, and accompanying drawings.

BRIEF DESCRIPTION OF THE DRAWINGS

In order to illustrate technical solutions of the present invention more clearly, drawings required being used in description will be simply introduced below. Obviously, the drawings in the following description are only one embodiment of the present invention; for one of ordinary skill in the art, other drawings can also be obtained according to these drawings on the premise of paying no creative work.

DETAILED DESCRIPTION

Figure 1:
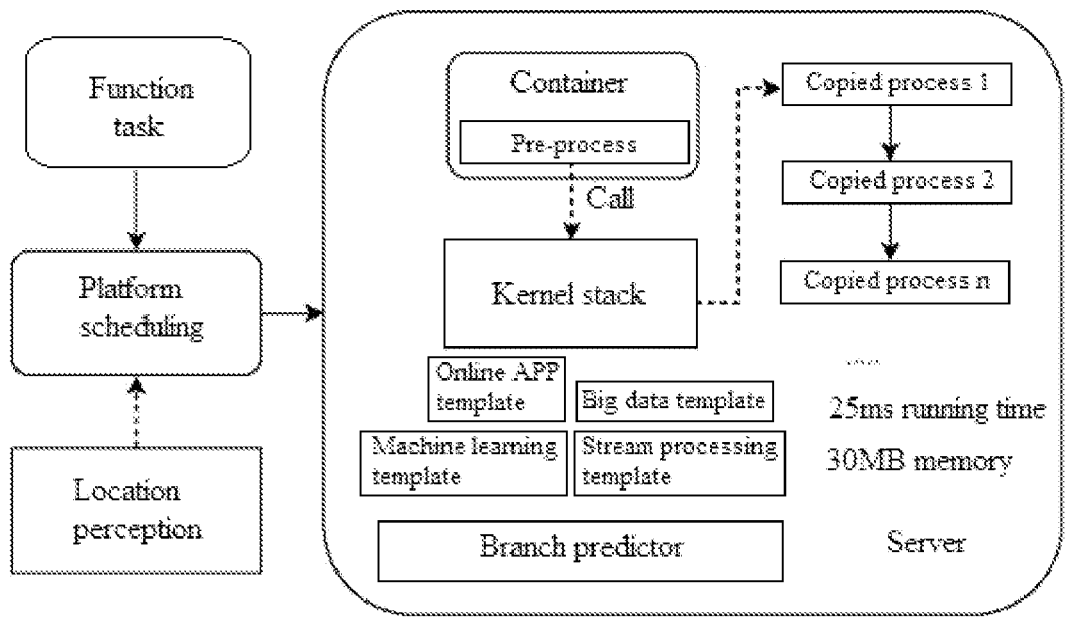
FIG. 1 is an overall design architecture diagram of a process parasitism-based branch prediction method for serverless computing provided by an embodiment of the present invention.

Exemplary embodiments of the present invention will be described below in more detail with reference to the accompanying drawings. Although exemplary embodiments of the present invention are shown in the accompanying drawings, it should be understood that the present invention can be implemented in various forms and should not be limited by the embodiments described here. On the contrary, these embodiments are provided in order that the present invention more thoroughly can be understood more thoroughly and the scope of the present invention can be fully conveyed to those skilled in the art.

In order to solve the problem existing in the prior art, the present invention provides a process parasitism-based branch prediction method and device for serverless computing, an electronic device, and a non-transitory readable storage medium.

Some concepts in serverless computing are explained as follows.

① Serverless computing: serverless computing is a method of providing back end services on demand. Serverless providers allow users to write and deploy codes without worrying about underlying infrastructure. Users obtaining back end services from serverless providers will pay based on the amount of computing and the amount of resource usage. As this service is automatically expanded, there is no need to reserve and pay for a fixed number of bandwidth or servers.

② Container: a container contains applications and all elements required for normal operation of the applications, which include system libraries, system settings, and other dependencies. Any type of application can run in a container, and regardless of where the containerized application is hosted, it will run in the same way. Similarly, a container can also carry serverless computing applications (i.e. functions) and run on any server on the cloud platform.

③ Instance: an instance refers to a running environment in which a certain application is running, such as a container A running a certain service, it can be considered that the container A is an instance of that service. In principle, functions of a serverless computing platform can be reduced to 0. Due to automatic scaling of serverless computing, a large number of serverless function instances can be pulled up in a preset period of time.

The basic idea of the present invention is as follows.

(1) Building Serverless Calculation Template Functions

The present invention, by investigating workloads of mainstream serverless functions, designs template functions centered around programming languages, if-else logic structures, for loop position features, and function features. Code amount of a template functions is usually 20-30% of that of a normal function, without generating any network request and disk operation, and execution time is usually 5-10 ms. For example, if multiple functions use Python to perform deep learning and are inferred as class functions of the same type, the multiple functions correspond to one template function, because their execution processes are basically the same: loading libraries, loading algorithm models, reading parameters, performing inferring, and returning results.

(2) Designing a Pre-Running Process for a Parasitic Container

The present invention, by redesigning a base container image, adds a pre-executed process in the base image. The pre-executed process starts to execute at the beginning of startup of the container, and calls system call in advance to trigger a process of a kernel copy template function.

(3) System Call Development of Fork Template Functions

The present invention achieves rapid replication of specified template functions by adding a kind of system call in a system kernel. The system call passes which template function needs to be copied in a manner of parameters, such as Python deep learning; the template functions include, for example, web template, bigdata template, ML template, and Stream template. Overall design architecture of the above process is as shown in FIG. 1.

Figure 2:
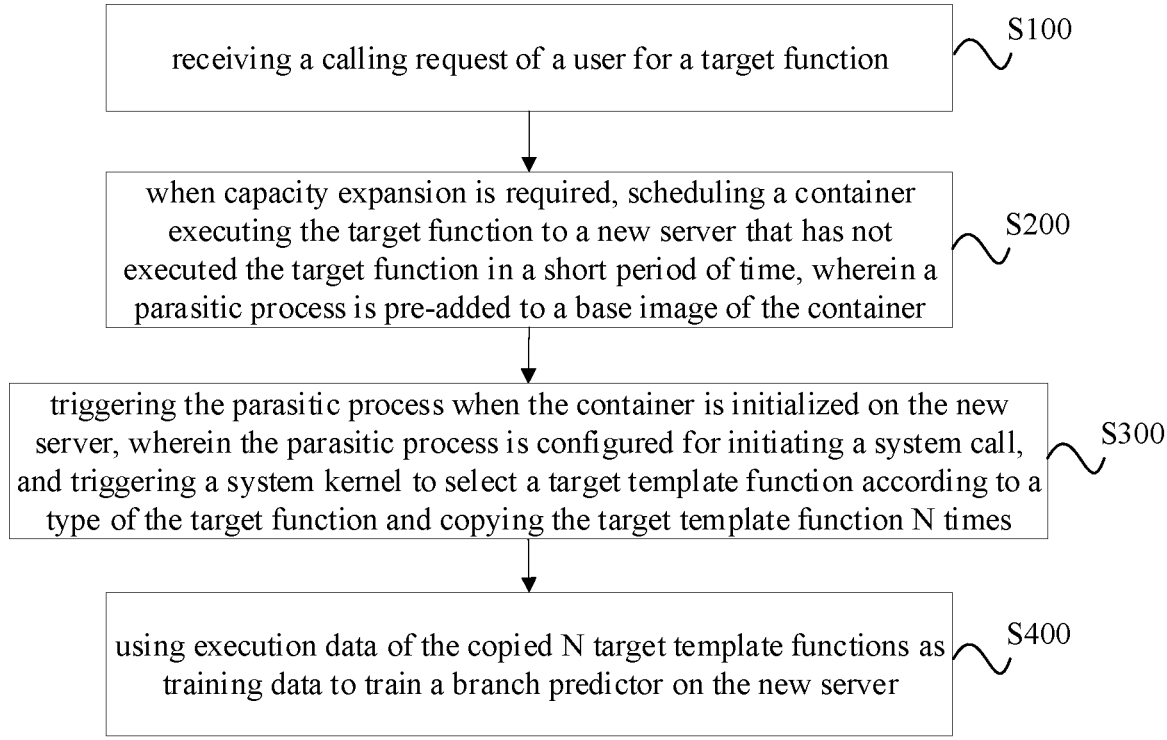
FIG. 2 is a flow chart of a process parasitism-based branch prediction method for serverless computing provided by an embodiment of the present invention.

Referring to FIG. 2, the present invention provides a process parasitism-based branch prediction method for serverless computing comprising the following steps: Step S100, receiving a calling request of a user for a target function; Step S200, when capacity expansion is required, scheduling a container executing the target function to a new server that has not executed the target function in a preset period of time, wherein a parasitic process is pre-added to a base image of the container; Step S300, triggering the parasitic process when the container is initialized on the new server, wherein the parasitic process is configured for initiating a system call, and triggering a system kernel to select a target template function according to a type of the target function and copying the target template function N times; and Step S400, using execution data of the copied N target template functions as training data to train a branch predictor on the new server.

Figure 3:
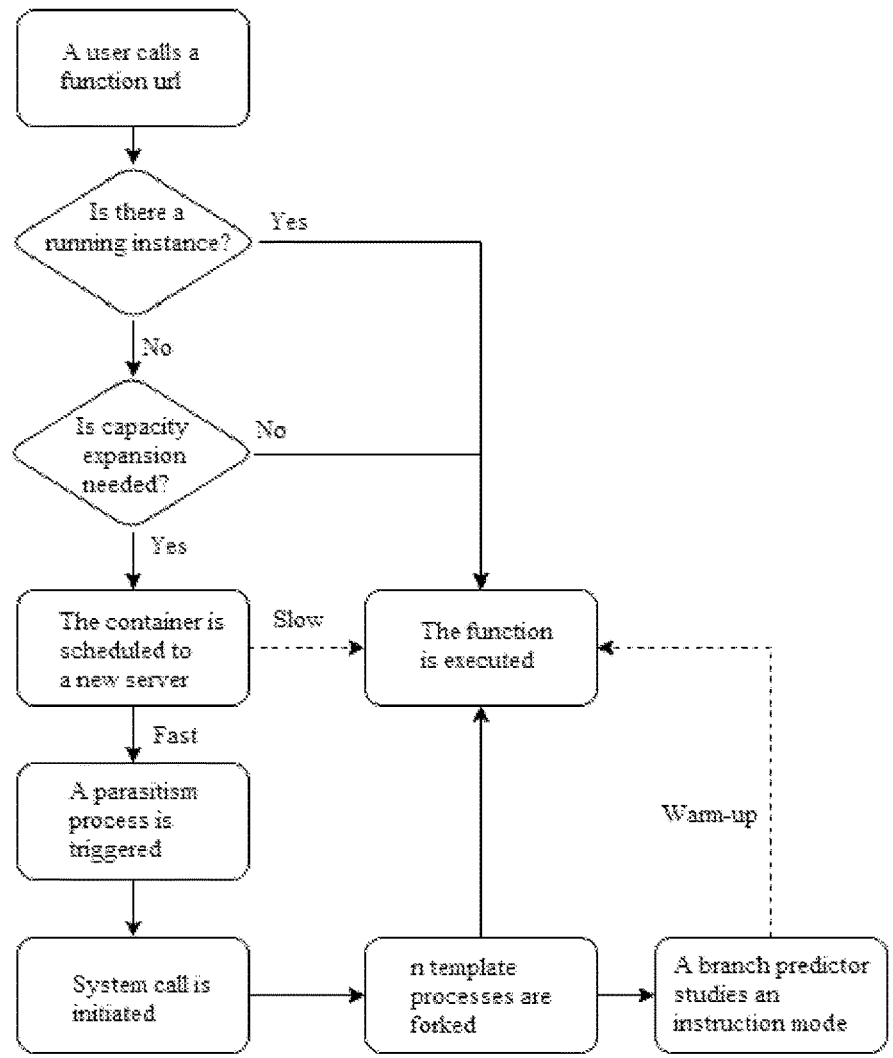
FIG. 3 is a flow chart of a process parasitism-based branch prediction method for serverless computing in a specific example of the present invention.

The above steps of the present invention are illustrated in detail below in accompany with FIG. 3.

In the step S100, a user initiates a call request for a target function through a client, the client can request call through web interfaces, command-line tools, RESTful APIs, and other forms.

Before executing the step S200, first, it is determined whether there is a running instance executing no function task in a current computing environment; if there is, the target function is scheduled to the instance executing no function task in the current computing environment, and the instance execute a calculation task of the target function. It can be understood that if there are function instances running in the environment, it is indicated that functions are in a warm-up state at this time. Therefore, when the target function task is scheduled to these machines, accuracy of branch prediction has improved effect. If there's none, it is then considered how to use the present invention to improve performance.

If there is no running instance executing no function task in the current computing environment, it is determined whether the current computing environment requires capacity expansion; if capacity expansion is not required, an instance is generated in the current computing environment, and the instance executes a calculation task of the target function. Specifically, whether capacity expansion is required is determined based on whether CPU usage of all instances in the current computing environment exceeds a preset value. For example, in the condition that the CPU usage of all instances exceeds the preset value, it is considered that the load is already high, so capacity expansion is needed. If there is no need for capacity expansion, it is possible to directly generate an instance in the current computing environment and use the instance to execute the calculation task of the target function.

If capacity expansion is needed, the step S200 is executed, a container executing the target function is scheduled to a new server that has not executed the target function in a preset period of time (i.e., a container is scheduled to a new server).

In the step S300, since the parasitic process is pre-added to the basic image of the container, when the container is initialized on a new server, the process buried in the container image (i.e. the parasitic process) will be executed first. The parasitic process will initiate a system call and trigger a system kernel to select a target template function according to a type of the target function and copying the target template function N times. The type of the target function is inferred using Python deep learning algorithm. Since one function type corresponds to one template function, once the type of the target function is determined, a corresponding target template function can be selected.

In the step S400, the copied N target template functions are automatically executed, and execution data can be used as training data to train a branch predictor on the new server.

It is understandable that when the container is scheduled to the new server, because the branch predictor (hardware design) is not familiar with this type of function, there will be many errors in prediction. Therefore, in the present invention, the template function is executed in advance to make the branch predictor be familiar with this type of function and provide a warm-up effect. Branch prediction generally only occurs in the case of code logic routing such as if-else. Therefore, as long as the template function is the same design result, it is possible to make the branch predictor be familiar with this logic structure in advance. After the same type of function is executed many times, the branch predictor will automatically become familiar with this function model and make accurate predictions. A specific training process of the branch predictor belongs to the category of branch predictor algorithm design, and will not be repeated here.

Furthermore, after the step S300: initializing the container on the new server succeeds, an instance is generated, and the instance executes a calculation task of the target function. Since triggering the parasitic process, initiating system call, and copying N template processes are conducted during initialization of the container, and generating the instance to execute the calculation task of the target function is conducted after initialization of the container succeeds, before executing the calculation task of the target function is executed, the branch predictor has already been trained by the execution data of the N target template functions, that is, when executing the calculation task of the target function, the branch predictor has had warming-up effect on the target function. Therefore, accuracy of branch prediction can be improved, and thus execution performance of functions in serverless computing is improved.

In summary, the present invention designs a template function based on function features, and uses a parasitic process to call system call during initialization of a container. The system calls a quickly fork template process, further improves accuracy of branch prediction through the template process, and improves execution performance of functions in serverless computing. The present invention has undergone sufficient experiments, and the results show that the present invention has improved accuracy of branch prediction by 49% and improved overall throughput by 38%, indicating that the design scheme of the present invention is feasible.

Figure 4:
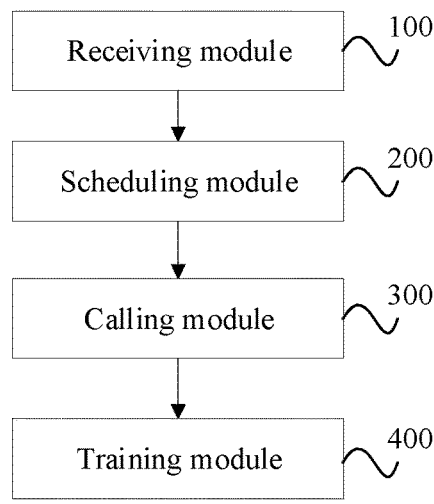
FIG. 4 is a structural diagram of a process parasitism-based branch prediction device for serverless computing provided by an embodiment of the present invention.

Based on the same invention concept, the present invention further provides a process parasitism-based branch prediction device for serverless computing, as shown in FIG. 4, comprising: a receiving module 100 configured to receive a calling request of a user for a target function; a scheduling module 200 configured to: when capacity expansion is required, schedule a container executing the target function to a new server that has not executed the target function in a preset period of time, wherein a parasitic process is pre-added to a base image of the container; a calling module 300 configured to: trigger the parasitic process when the container is initialized on the new server, wherein the parasitic process is configured to initiate a system call, and trigger a system kernel to select a target template function according to a type of the target function and copying the target template function N times; and a training module 400 configured to use execution data of the copied N target template functions as training data to train a branch predictor on the new server.

Optionally, the process parasitism-based branch prediction device for serverless computing further includes: a first determining module configured to: after the receiving module 100 receives a calling request of a user for a target function, determine whether there is a running instance executing no function task in a current computing environment; if there is, trigger a first executing module; and the first executing module configured to: schedule the target function to the instance executing no function task in the current computing environment, and execute a calculation task of the target function using the instance.

Optionally, the process parasitism-based branch prediction device for serverless computing further includes: a second determining module configured to: if there is no running instance executing no function task in the current computing environment, determine whether the current computing environment requires capacity expansion; if capacity expansion is not required, trigger a second executing module; and the second executing module configured to: generate an instance in the current computing environment, and execute a calculation task of the target function using the instance.

Optionally, that the second determining module determines whether the current computing environment requires capacity expansion is specifically: determining whether CPU usage of all instances in the current computing environment exceeds a preset value; if yes, determining that the current computing environment requires capacity expansion.

Optionally, the process parasitism-based branch prediction device for serverless computing further includes: a third executing module configured to: after the container is initialized on the new server, generate an instance, and execute a calculation task of the target function using the instance.

Optionally, the type of the target function is inferred using Python deep learning algorithm.

Optionally, the target template function is centered around programming languages, if-else logic structures, for loop position features, and function features.

Regarding the device embodiments, due to their basic similarity to the method embodiments, the description is relatively simple. Please refer to partial explanation of the method embodiments for relevant details.

Based on the same invention concept, the present invention further provides an electronic device comprising a processor and a memory, wherein the memory stores a computer program, and the processor, when executing the computer program, implements the steps of the above-described process parasitism-based branch prediction method for serverless computing.

The processor may be a central processing unit (CPU), controller, microcontroller, microprocessor, or other data processing chips in some embodiments. This processor is typically used to control the overall operation of the electronic device. In this embodiment, the processor is used to run program codes or process data stored in the memory, for example, run program codes of the process parasitism-based branch prediction method for serverless computing.

The memory includes at least one type of non-transitory readable storage medium, the non-transitory readable storage medium includes flash memory, hard disk, multimedia card, card type memory (such as SD or DX memory, etc.), random access memory (RAM), static random access memory (SRAM), read only memory (ROM), electrically erasable programmable read-only memory (EEPROM), programmable read-only memory (PROM), magnetic memory, magnetic disk, optical disc, etc. In some embodiments, the memory may be an internal storage unit of the electronic device, such as the hard disk or memory of the electronic device. In other embodiments, the memory can also be an external storage device of the electronic device, such as a plug-in hard disk, smartmedia card (SMC), secure digital (SD) card, flash card, etc., which is equipped on the electronic device. Of course, the memory can also not only include the internal storage unit of the electronic device but also include its external storage device. In this embodiment, the memory is typically used to store operating methods and various application software installed in the electronic device, such as program codes of the process parasitism-based branch prediction method for serverless computing and the like. In addition, the memory can also be used to temporarily store various types of data that have been output or will be output.

Based on the same invention concept, the present invention further provides a non-transitory readable storage medium, wherein the non-transitory readable storage medium stores a computer program, and the computer program, when being executed by a processor, implements the steps of the above-described process parasitism-based branch prediction method for serverless computing.

In summary, the process parasitism-based branch prediction method and device for serverless computing, electronic device, and non-transitory readable storage medium provided by the present invention have the following advantages and positive effect: 1. Compared with redesigning branch predictors, the present invention has universality. By the method of pre-executing a template function, the present invention can improve accuracy of branch prediction of all types of servers, improve execution performance of functions in serverless computing, and is applicable to all architectures (including ARM, RISC-V, etc.). 2. Compared with the time locality of the branch prediction algorithm, the present invention executes the template function in advance, and makes full use of the time locality of branch predictors.

Those skilled in the art should understand that embodiments of the present invention can be provided as methods, systems, or computer program products. Therefore, the present invention can take the form of complete hardware embodiments, complete software embodiments, or embodiments combining software and hardware aspects. Moreover, the present invention may take the form of a computer program product implemented on one or more computer available storage media (including but not limited to disk memory, optical memory, etc.) containing computer available program codes.

The present invention is described with reference to flowcharts and/or block diagrams of methods, devices (systems), and computer program products according to embodiments of the present invention. It should be understood that each process and/or box in a flowchart and/or block diagram, as well as combination of processes and/or boxes in the flowchart and/or block diagram, can be implemented by computer program instructions. These computer program instructions can be provided to general-purpose computers, specialized computers, embedded processors, or processors of other programmable data processing devices to generate a machine, so that instructions executed by computers or processors of other programmable data processing devices generate a device used to implement functions specified in a procedure or multiple procedures of a flowchart and/or a box or multiple boxes in a block diagram.

These computer program instructions can also be stored in a computer readable memory that can guide a computer or other programmable data processing device to work in a specific way, such that the instructions stored in the computer readable memory generate a manufacturing product including an instruction device, the instruction device implements functions specified in a procedure or multiple procedures of a flowchart and/or a box or multiple boxes in a block diagram.

These computer program instructions can also be loaded onto a computer or other programmable data processing device, such that a series of operational steps are executed on the computer or other programmable device to generate computer-implemented processing. Thus, the instructions executed on the computer or other programmable device provide steps for implementing functions specified in a procedure or multiple procedures of a flowchart and/or a box or multiple boxes in a block diagram.

Obviously, technicians in this field can make various modifications and variations to the present invention without departing from the spirit and scope of the present invention. In this way, if these modifications and variations of the present invention fall within the scope of the claims and their equivalents, the present invention is also intended to include these modifications and variations.

What is claimed is:

1. A process parasitism-based branch prediction method for serverless computing comprising the following steps: receiving a calling request of a user for a target function; when capacity expansion is required, scheduling a container executing the target function to a new server that has not executed the target function in a preset period of time, wherein a parasitic process is pre-added to a base image of the container; triggering the parasitic process when the container is initialized on the new server, wherein the parasitic process is configured for initiating a system call, and triggering a system kernel to select a target template function according to a type of the target function and copying the target template function N times; and using execution data of the copied N target template functions as training data to train a branch predictor on the new server.

2. The process parasitism-based branch prediction method for serverless computing according to claim 1, after the receiving a calling request of a user for a target function, further comprising: determining whether there is a running instance executing no function task in a current computing environment; if there is, scheduling the target function to the instance executing no function task in the current computing environment, and executing a calculation task of the target function using the instance.

3. The process parasitism-based branch prediction method for serverless computing according to claim 2, further comprising: if there is no running instance executing no function task in the current computing environment, determining whether the current computing environment requires capacity expansion; if capacity expansion is not required, generating an instance in the current computing environment, and executing a calculation task of the target function using the instance.

4. The process parasitism-based branch prediction method for serverless computing according to claim 3, wherein the determining whether the current computing environment requires capacity expansion comprises: determining whether CPU usage of all instances in the current computing environment exceeds a preset value; if yes, determining that the current computing environment requires capacity expansion.

5. The process parasitism-based branch prediction method for serverless computing according to claim 1, further comprising: after the container is initialized on the new server, generating an instance, and executing a calculation task of the target function using the instance.

6. The process parasitism-based branch prediction method for serverless computing according to claim 1, wherein the type of the target function is inferred using Python deep learning algorithm.

7. The process parasitism-based branch prediction method for serverless computing according to claim 1, wherein the target template function is centered around programming languages, if-else logic structures, for loop position features, and function features.

8. A process parasitism-based branch prediction device for serverless computing comprising: a receiving module configured to receive a calling request of a user for a target function; a scheduling module configured to: when capacity expansion is required, schedule a container executing the target function to a new server that has not executed the target function in a preset period of time, wherein a parasitic process is pre-added to a base image of the container; a calling module configured to: trigger the parasitic process when the container is initialized on the new server, wherein the parasitic process is configured to initiate a system call, and trigger a system kernel to select a target template function according to a type of the target function and copy the target template function N times; and a training module configured to use execution data of the copied N target template functions as training data to train a branch predictor on the new server.

9. An electronic device comprising a processor and a memory, wherein the memory stores a computer program, and the computer program, when being executed by the processor, implements the steps of the process parasitism-based branch prediction method for serverless computing according to claim 1.

10. A non-transitory readable storage medium, wherein the non-transitory readable storage medium stores a computer program, and the computer program, when being executed by a processor, implements the steps of the process parasitism-based branch prediction method for serverless computing according to claim 1.

\* \* \* \* \*